(12) United States Patent
Radzilowski et al.

(10) Patent No.: US 12,042,850 B2
(45) Date of Patent: Jul. 23, 2024

(54) DETECTION AND REMOVAL OF CONTINUOUS CASTER-RELATED DEFECTS ON SLABS

(71) Applicant: AK Steel Properties, Inc., West Chester, OH (US)

(72) Inventors: Ronald H. Radzilowski, Canton, MI (US); William L. King, Middletown, OH (US)

(73) Assignee: Cleveland-Cliffs Steel Properties Inc.

( * ) Notice: Subject to any disclaimer, the term of this patent is extended or adjusted under 35 U.S.C. 154(b) by 384 days.

(21) Appl. No.: 17/186,239

(22) Filed: Feb. 26, 2021

(65) Prior Publication Data

US 2021/0268574 A1   Sep. 2, 2021

Related U.S. Application Data

(60) Provisional application No. 62/982,200, filed on Feb. 27, 2020.

(51) Int. Cl.
*B22D 11/16* (2006.01)
*G01N 29/04* (2006.01)
*G01N 29/24* (2006.01)

(52) U.S. Cl.
CPC .......... *B22D 11/16* (2013.01); *G01N 29/043* (2013.01); *G01N 29/2412* (2013.01); *G01N 2291/0289* (2013.01); *G01N 2291/044* (2013.01)

(58) Field of Classification Search
CPC ....... B22D 11/16; B22D 11/22; B22D 11/205; B22D 11/12; G01N 29/043; G01N 29/2412; G01N 2291/044; G01N 2291/0289

USPC .......................................................... 73/632
See application file for complete search history.

(56) References Cited

U.S. PATENT DOCUMENTS

| 4,131,490 | A |   | 12/1978 | Oishi et al. |
| 4,318,439 | A |   | 3/1982 | Hiroshima et al. |
| 7,278,315 | B1 | * | 10/2007 | Klein .................. G01N 29/221 73/598 |
| 8,976,017 | B1 | * | 3/2015 | Cannon ................ G01N 29/043 340/514 |
| 9,617,617 | B2 | * | 4/2017 | Rundquist ................. C22B 9/05 |

(Continued)

FOREIGN PATENT DOCUMENTS

| CN | 102798667 | 11/2012 |
| CN | 110653494 | 1/2020 |

(Continued)

OTHER PUBLICATIONS

Baillie, I. et al., "Implementing an ultrasonic inspection system to find surface and internal defects in hot, moving steel using EMATs", Insight vol. 49, No. 2, pp. 87-95 Feb. 2007.

(Continued)

*Primary Examiner* — Jacques M Saint Surin
(74) *Attorney, Agent, or Firm* — Frost Brown Todd LLP

(57) ABSTRACT

A defect detection and remediation system can be used to detect and remediate sub-surface defects within a cast metal during the continuous casting stage. The system can include a detection device having one or more detection units to detect a defect within the cast metal using ultrasonic waves and a remediation device having one or more remediation units to remediate the defect detected by the detection device in a target area of the cast metal containing the detected defect.

16 Claims, 9 Drawing Sheets

(56) References Cited

U.S. PATENT DOCUMENTS

| | | | | |
|---|---|---|---|---|
| 10,233,515 B1 * | 3/2019 | Rundquist | ............. | B22D 1/005 |
| 11,360,039 B2 * | 6/2022 | Zappulla | ............. | B22D 2/006 |
| 2015/0064059 A1 * | 3/2015 | Ishihara | ................ | B29D 30/00 |
| | | | | 164/47 |

FOREIGN PATENT DOCUMENTS

| | | | | |
|---|---|---|---|---|
| CN | 110779990 | 2/2020 | | |
| EP | 3069133 | 9/2016 | | |
| JP | S53-040636 | 4/1978 | | |
| JP | S54-109031 | 8/1979 | | |
| JP | H04274892 | 9/1992 | | |
| JP | H08-090226 | 4/1996 | | |
| JP | 2001208730 | 8/2001 | | |
| JP | 2005305534 | 11/2005 | | |
| JP | 2007017297 | 1/2007 | | |
| JP | 2007222884 | 9/2007 | | |
| JP | 2008238259 | 10/2008 | | |
| JP | 2012163406 | 8/2012 | | |
| JP | 2016191573 | 11/2016 | | |
| KR | 20170055205 | 5/2017 | | |
| KR | 10-2017-067935 | 8/2017 | | |
| KR | 101767935 | * 8/2017 | ............ | B22D 11/12 |
| WO | WO2008079100 | 7/2008 | | |
| WO | WO2014102051 | 7/2014 | | |

OTHER PUBLICATIONS

Brown, Matthew S. et al., "Fundamentals of Laser-Material Interaction and Application to Multiscale Surface Modification," Chapter 4, in K. Sugioka et al.(eds.), *Laser Precision Microfabrication*, Springer Series in Materials Science 135, Springer-Verlag Berlin Heidelberg 2010, pp. 91-120.

International Search Report and Written Opinion dated May 3, 2021 for Application No. PCT/2021/019810, 14 pages.

* cited by examiner

DETECTION AND REMOVAL OF CONTINUOUS CASTER-RELATED DEFECTS ON SLABS

PRIORITY

This application claims priority to U.S. Provisional Application Ser. No. 62/982,200, filed Feb. 27, 2020, entitled "Detection and Removal of Continuous Caster-Related Defects on Slabs," the disclosure of which is incorporated herein by reference.

BACKGROUND

During a typical continuous casting process, liquid metal such as steel is solidified into a cast metal that can be cut into a semifinished slab for subsequent finishing (e.g., rolling, coiling, coating, etc.) In some instances, caster-related defects (e.g., laminations, cracks, pin holes, etc.) can form during the continuous casting process at and/or near the surface of the cast metal. These near sub-surface defects typically manifest themselves downstream, after the continuous casting process, making such defects difficult to detect and/or remediate. This can result in all or a portion of the cast metal being subjected to surface scarfing and/or rejection, creating additional costs. Accordingly, it may be desirable to detect and/or remediate near sub-surface, caster-related defects within a cast metal at the continuous casting stage, such as when the cast metal has retained thermal energy from the continuous casting process, prior to subsequent finishing. This can decrease the number of near sub-surface caster-related defects in a finished product, which can decrease costs and/or increase efficiency of the continuous casting process.

DETAILED DESCRIPTION

A defect detection and remediation system can be used to remediate near sub-surface, caster related defects detected within a cast metal during the continuous casting stage, prior to subsequent finishing. The system comprises a detection device for detecting whether a defect is present within the cast metal and a remediation device for remediating the defect detected by the detection device in a target area containing the defect. The detection device comprises one or more signal generators configured to generate a pulse directed toward the surface of the cast metal to thereby generate one or more ultrasonic waves within the cast metal and one or more receivers spaced a distance away from the one or more signal generators that are configured to receive a signal caused by the one or more ultrasonic waves within the cast metal. The system can then detect the presence of the defect based on one or more characteristics (e.g., amplitude, frequency, wavelength, etc.) of the signal received by the receiver.

The system can then determine whether the detected defect can be remediated, such as based on a size and/or position of the detected defect. The remediation device comprises one or more remediation units having a laser configured to generate a beam directed toward the surface of the cast metal in the target area containing the defect. The remediation unit can thereby smooth the detected defect by one or more of ablation, melting, grinding, and scarfing in the target area. This spot remediation of detected sub-surface defects in cast metal can reduce the amount of cast metal subjected surface scarfing and/or rejection to thereby improve costs and/or efficiency of the continuous casting process. Because the system is not physically coupled with the cast metal, the system is operable in a high temperature and/or contaminated environment.

I. Exemplary Defect Detection and Remediation System

Figure 1:
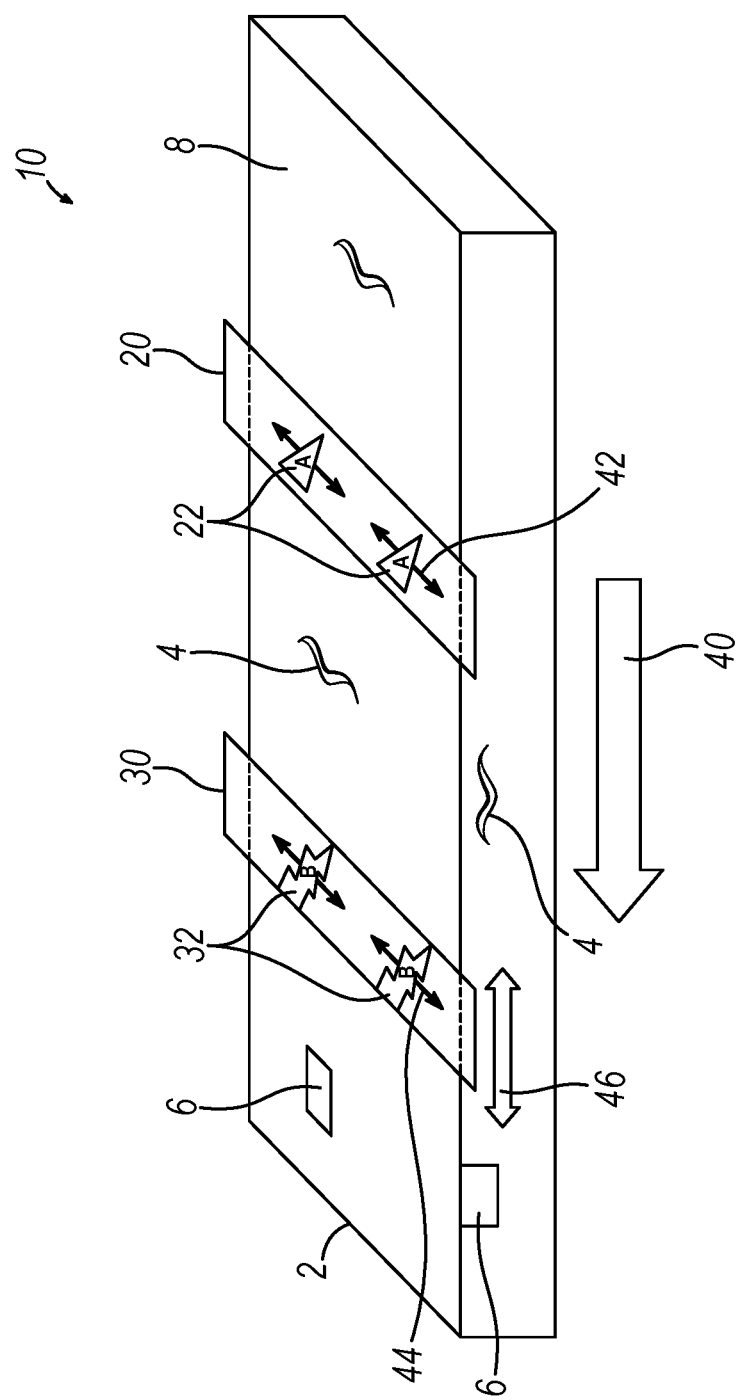
FIG. 1 is a perspective view of an exemplary defect detection and remediation system for use on continuously cast metal.

Referring to FIG. 1, an exemplary defect detection and remediation system 10 is shown for use on continuously cast metal 2 such as steel to reduce the number and/or extent of near sub-surface defects 4 within cast metal 2. System 10 comprises a detection device 20 having one or more detection units 22 and a remediation device 30 having one or more remediation units 32. Detection units 22 of detection device 20 are configured to detect defects 4, such as caster-related defects (e.g., laminations, cracks, pin holes, etc.), at a surface 8 and/or near sub-surface to surface 8 of cast metal 2. For instance, detection device 20 can detect one or more defects 4 having a depth of about 10 millimeters or less, such as about 5 millimeters or less. While the illustrated version shows a detection device 20 having two detection units 22, any other suitable number of detection units 22 can be used such that detection device 20 can sufficiently detect the presence of a near sub-surface defect 4 of cast metal 2. Remediation units 32 of remediation device 30 are configured to remediate defects 4 detected by detection device 20 by removing and/or improving the number and/or extent of detected defects 4 by forming a remediated area 6 that is more continuous than when the area contained defect 4. While the illustrated version shows a remediation device 30 having two remediation units 32, any other suitable number of remediation units 32 can be used such that remediation device 30 can sufficiently improve and/or remediate a defect 4 at and/or near a surface 8 of cast metal 2 at a desired area of cast metal 2.

Accordingly, system 10 is configured to remediate a defect 4 detected on cast metal 2 during the continuous casting stage, such as when the cast metal 2 has retained thermal energy from the continuous casting process, prior to subsequent finishing (e.g., rolling, coiling, coating, etc.). System 10 can operate in high temperatures of up to about 1,000° C., such as up to about 700° C. Additionally or alternatively, system 10 can remediate defects 4 on cast metal 2 after cast metal 2 is cooled, prior to subsequent finishing. System 10 is further configured to operate while cast metal 2 is translated relative to system 10, as shown by arrow 40 in FIG. 1. For instance, system 10 can be installed at a caster run-out table, where cast metal 2 is cut into slabs such that system 10 can remediate defects before and/or after cast metal 2 is cut into slabs. In some versions, system 10 can operate while cast metal 2 is moved at a speed between about 0.5 meters per second and about 5 meters per second relative to system 10, though other suitable speeds can be used such that system 10 can sufficiently detect and/or remediate a defect 4 on cast metal 2.

As shown in FIG. 1, one or more detection units 22 of detection device 20 can be stationary within detection device 20 and/or one or more detection units 22 can translate laterally across cast metal 2 transverse to the direction of translation of cast metal 2, as shown by arrow 42. Accordingly, one or more detection units 22 can be spaced in an array and/or movable along detection device 20 such that detection units 22 can detect a defect 4 in a select area of cast metal 2, such as along a portion or an entire surface 8 of cast metal 2. Likewise, one or more remediation units 32 of remediation device 30 can be stationary and/or one or more remediation units 32 can translate laterally across cast metal 2 transverse to the direction of translation of cast metal 2, as shown by arrow 44. Accordingly, one or more remediation units 32 can be spaced in an array and/or movable along remediation device 30 such that remediation units 32 can remediate a defect 4 in a select area of cast metal 2, such as along a portion or an entire surface 8 of cast metal 2.

In some versions, a distance between detection device 20 and remediation device 30 can be adjusted. In the illustrated version, remediation device 30 is moveable longitudinally along the direction of translation of cast metal 2 relative to detection device 20 such that remediation device 30 is moveable closer to and/or farther from detection device 20, as shown by arrow 46. This can also allow remediation device 30 to translate with cast metal 2 as remediation device 30 remediates a defect 4. Additionally or alternatively, detection device 20 can be movable longitudinally. Still other suitable configurations for system 10 will be apparent to one with ordinary skill in the art in view of the teachings herein. For instance, in some versions, detection device 20 and/or remediation device 30 can be water-cooled.

A. Exemplary Detection Device

Figure 2:
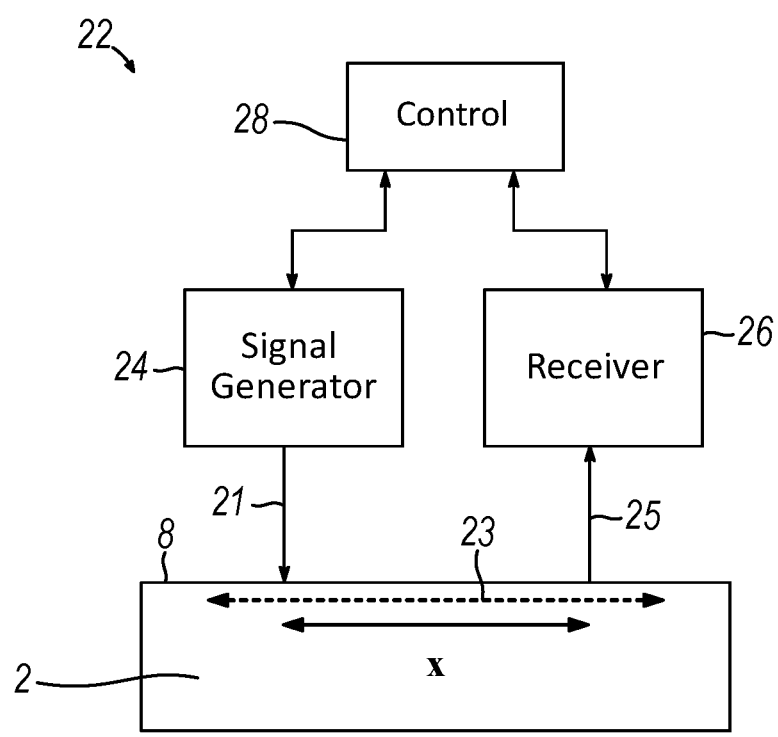
FIG. 2 is a side elevational view of a detection unit of the defect detection and remediation system of FIG. 1.

Referring to FIG. 2, a detection unit 22 of detection device 20 comprises one or signal generators 24 and one or more receivers 26. Signal generator 24 is configured to generate an ultrasonic pulse 21 that is directed toward a surface 8 of cast metal 2. Signal generator 24 can be coupled with a control 28 such that control 28 can be configured to control pulse 21 of signal generator 24 (e.g., a pulse rate, a pulse energy, a wavelength, frequency, etc.). Pulse 21 generated by signal generator 24 is at least partially absorbed by cast metal 2 such that pulse 21 forms one or more ultrasonic waves 23 that travel through cast metal 2. Receiver 26 is spaced away from signal generator 24 at a select distance x and is configured to detect a signal 25 caused by waves 23. Receiver 26 can be coupled with control 28 such that control 28 can be configured to receive signal 25 detected by receiver 26. Control 28 can be configured to analyze characteristics (e.g., a pulse rate, a pulse energy, an amplitude, a wavelength, frequency, etc.) of signal 25 to determine whether a defect is present near surface 8 within cast metal 2 based on signal 25.

For instance, control 28 can determine whether the characteristics of signal 25 have been altered relative to pulse 21 and/or whether the characteristics fail to meet a predetermined level to determine that a defect is present within cast metal 2. Detection device 20 is thereby configured to detect whether a defect is present below a desired surface 8 of cast metal 2. In some versions, detection device 20 can further be configured to determine the position and/or size of the detected defect based on the received signal 25. Because signal generator 24 and receiver 26 are spaced away from surface 8 of cast metal 2 without a physical coupling with cast metal 2, detection unit 22 is operable at high temperatures and/or in a contaminated environment such as when surface 8 contains residue from the continuous casting process.

Figure 3:
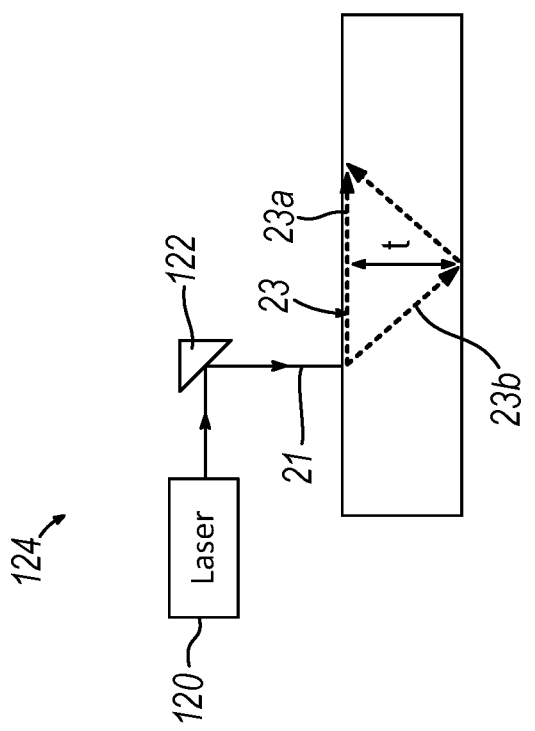
FIG. 3 is a side elevational view of a first exemplary signal generator for use with the detection unit of FIG. 2.

Signal generator 24 can comprise a laser, an electromagnetic acoustic transducer (EMAT), and/or other suitable signal generator that is configured to generate pulse 21. Referring to FIG. 3, a first exemplary signal generator 124 comprises a laser 120, such as a pulsed laser, that provides a beam to generate pulse 21. Pulse 21 thereby forms one or more ultrasonic waves 23, such as a Rayleigh wave that includes a surface wave 23a and/or a bulk wave 23b, as pulse 21 contacts cast metal 2. For instance, surface waves 25a travel along a surface 8 of cast metal 2 and bulk waves 25b travel within a thickness t of cast metal 2. In some versions, the beam generated by laser 120 is redirected toward a surface 8 of cast metal 2 by a beam guide 122, such as a prism or other suitable beam guide 122 that is configured to redirect the beam toward cast metal 2.

Figure 4:
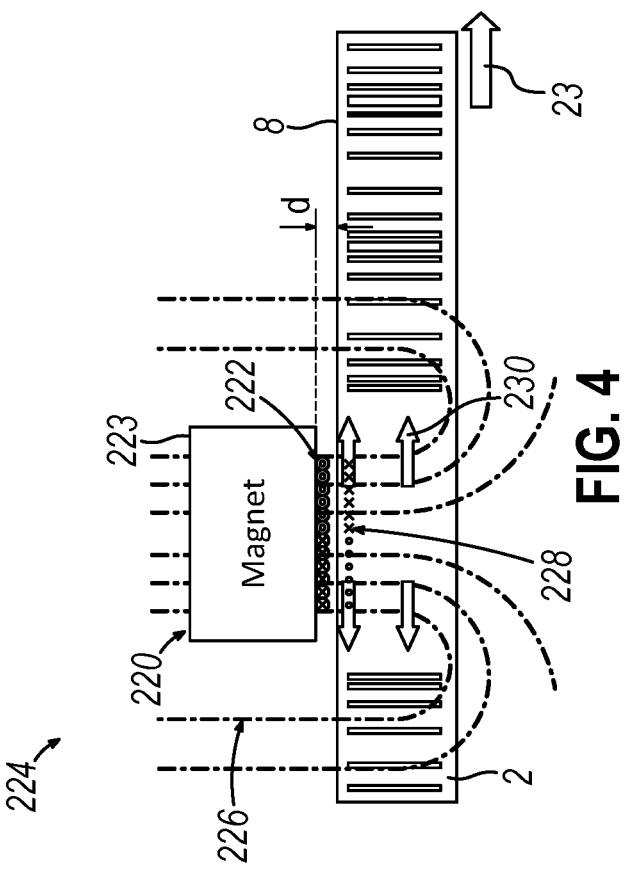
FIG. 4 is a side elevational view of a second exemplary signal generator for use with the detection unit of FIG. 2.

Referring to FIG. 4, a second exemplary signal generator 224 comprises an EMAT 220. EMAT 220 comprises an electric coil 222 and a magnet 223. Magnet 223 can be a permanent magnet and/or an electromagnet. Accordingly, EMAT 220 is configured to operate by a combination of electromagnetic induction and Lorentz forces. For instance, a short duration of high intensity current is pulsed through coil 222 and a transient magnetic field from the current pulse in coil 222 induces an opposed current 228 in cast metal 2. This current is subjected to Lorentz forces 230 due to the presence of both the transient magnetic field and a fixed magnetic field 226 created by the presence of magnet 223. The Lorentz forces 230 thereby create one or more ultrasonic waves 23, such as Rayleigh waves, in cast metal 2. By choosing the shape of coil 222 and/or magnet 223, the direction of forces 230 and/or wave 23 generated by EMAT 220 can be controlled. An example of an EMAT 220 that can be used as a signal generator 224 is a RPR4000 toneburst generator manufactured by RITEC Inc. in Warwick, RI. EMAT 220 can operate at ultrasonic frequencies above 20 kilohertz, such as about 750 kilohertz. As shown in FIG. 4, coil 222 of EMAT 220 is spaced a distance d away from a surface 8 of cast metal 2. In some versions, coil 222 is spaced about 5 millimeters away from surface 8, though other suitable dimensions can be used such that EMAT 220 is configured to sufficiently generate one or more waves 23 within cast metal 2.

Figure 5:
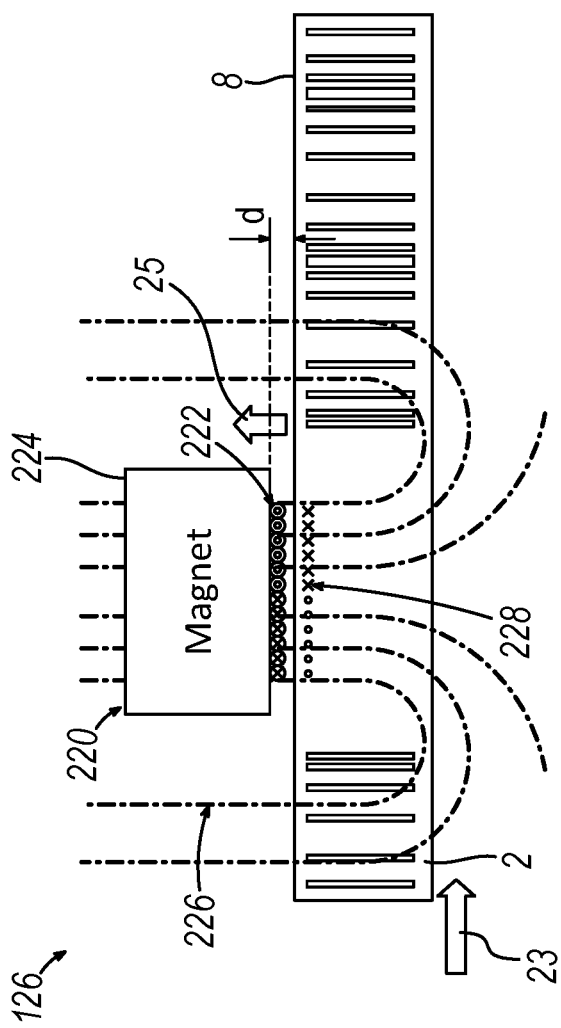
FIG. 5 is a side elevational view of an exemplary receiver for use with the detection unit of FIG. 2.

FIG. 5 shows an exemplary receiver 126 for use in a detection unit 22 that comprises EMAT 220 for detecting and/or receiving a signal 25 caused by waves 23. As discussed above, EMAT 220 comprises an electric coil 222 and a magnet 223. Magnet 223 can be a permanent magnet and/or an electromagnet. The interaction of waves 23 in the presence of a fixed magnetic field 226 from magnet 223 induces currents 228 in the receiving coil 222 to form signal 25. EMAT 220 can be configured to detect a wide range of frequencies, such as about 50 kilohertz to about 1050 kilohertz, to allow EMAT 220 to detect a variety of wave types. Control 28 can then analyze characteristics (e.g., amplitude, wavelength, frequency etc.) of the received signal 25 to determine whether a defect 4 is present.

Accordingly, detection unit 22 can be configured to detect a near sub-surface defect 4 along a portion and/or an entire select surface 8 of cast metal 2. Referring to FIGS. 6-9, cast metal 2 can be translated relative to detection unit 22, as shown by arrow 40 in FIG. 6. As cast metal 2 moves, signal generator 24 of detection unit 22 generates pulse 21 that creates one or more ultrasonic waves 23, such as Rayleigh waves, along surface 8 and/or within cast metal 2 that travel at least a distance x to receiver 26. Receiver 26 can then detect a signal 25 generated by waves 23 at receiver 26. For instance, Rayleigh waves can be more intense at surface 8 and have energy content that penetrates down into cast metal 2 to a depth proportional to the wavelength of the Rayleigh wave. Signal 25 received by receiver 26 can indicate whether such Rayleigh waves are being blocked and/or reflected due to defects 4. In some instances, the wavelengths of the portion of the Rayleigh waves that are being blocked and/or reflected by a defect 4 are proportional to a size and/or depth of such defect 4.

Figure 6:
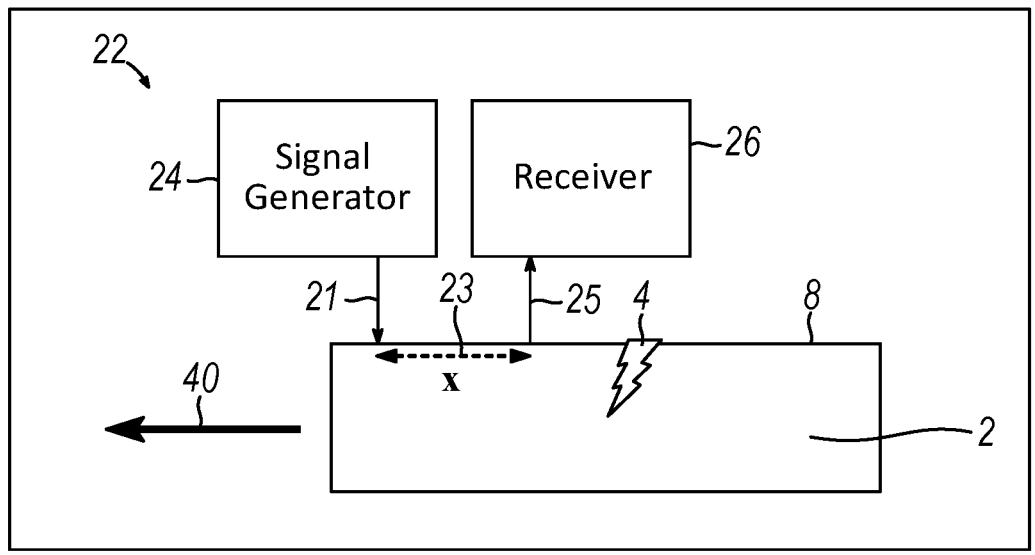
FIG. 6 is a side elevational view of the detection unit of FIG. 2, showing a continuously cast metal containing a defect being translated relative to the detection unit.
Figure 7:
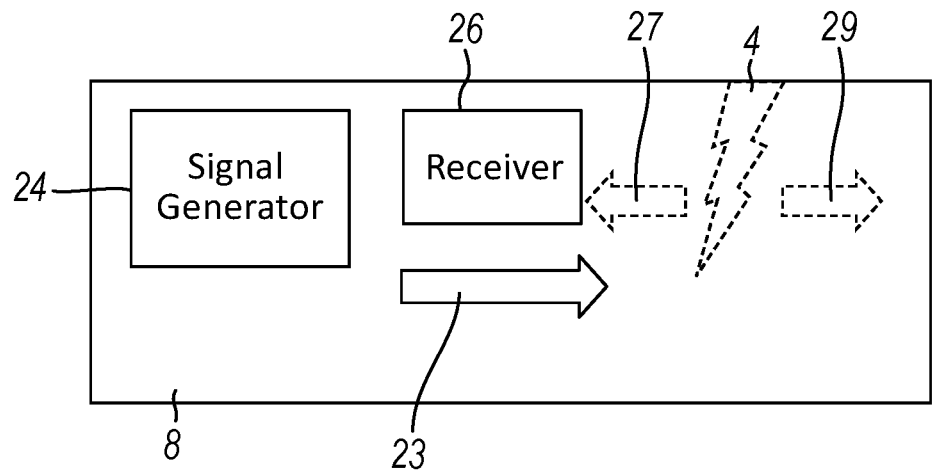
FIG. 7 is a top plan view of the detection unit of FIG. 6.
Figure 9:
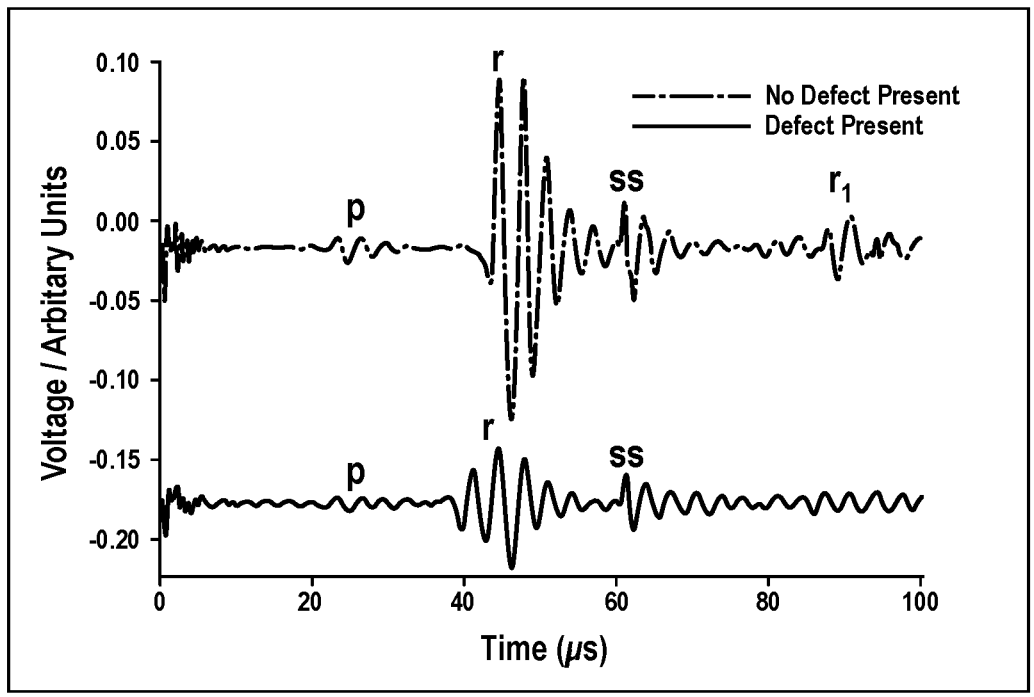
FIG. 9 is a graph showing a signal detected by the detection unit of FIG. 6.
Figure 11:
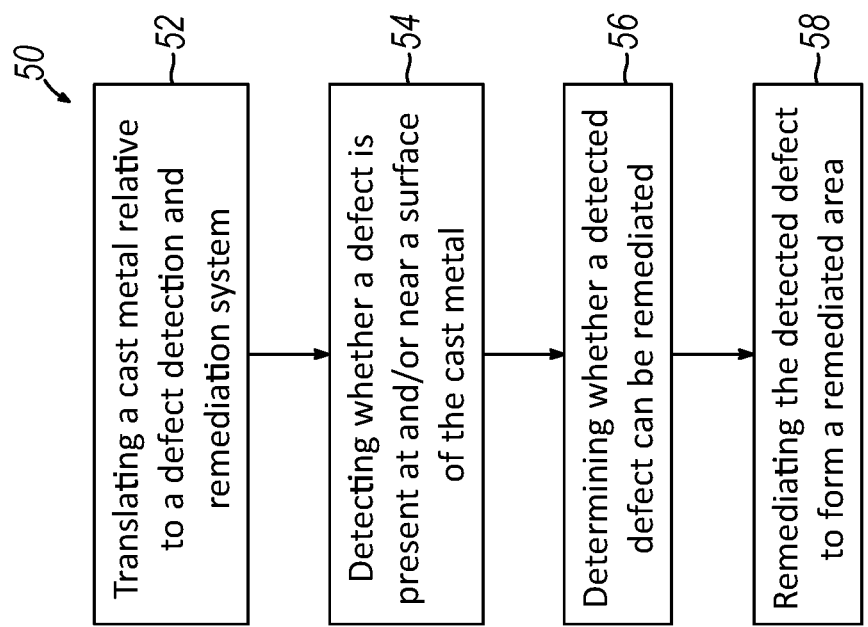
FIG. 11 is a flowchart of an exemplary method of detecting and remediating a defect in a cast metal with the defect detection and remediation system of FIG. 1.

In FIGS. 6-7, a defect 4 within cast metal 2 is outside of signal generator 24 and receiver 26. Accordingly, receiver 26 can directly detect wave 23 generated by signal generator 24, which can have a relatively large amplitude. A first portion 27 of wave 23 can then be by blocked and/or reflected by defect 4 back towards receiver 26 and a second portion 29 of the wave 23 can continue to travel past defect 4. The reflected portion 27 of wave 23 can arrive progressively earlier as defect 4 moves toward detection unit 22. Referring to FIG. 9, an example of a signal 25 received by receiver 26 for the illustrated version is shown in a broken line. For instance, the directly received wave 23 is shown at region r and the reflected received portion 27 of wave 23 is shown at region $r_1$, which has a smaller amplitude relative to the directly received wave 23.

Figure 8:
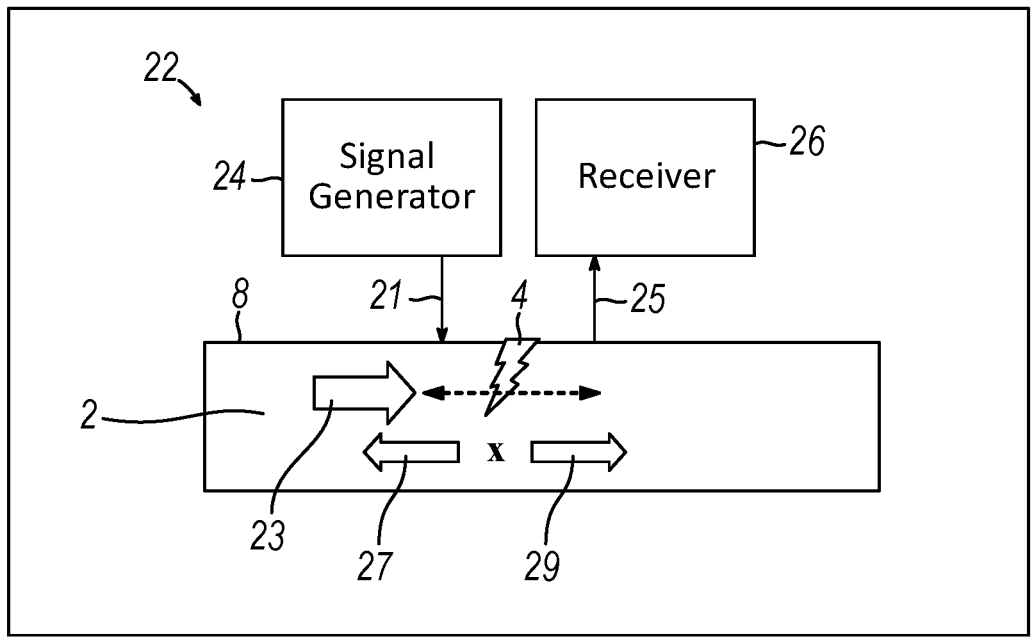
FIG. 8 is a side elevational view of the detection unit of FIG. 6, showing the defect positioned within the detection unit.

In FIG. 8, defect 4 of cast metal 2 has been translated to within detection unit 22 between signal generator 24 and receiver 26. Accordingly, the direct wave 23 generated by signal generator 24 cannot fully travel distance x to receiver 26 because defect 4 at least partially blocks and/or reflects wave 23. The first portion 27 of wave 23 blocked and/or reflected by defect 4 can travel away from receiver 26 and the second portion 29 of wave 23 can continue to travel past defect 4 to receiver 26. In some versions, higher frequencies can be blocked by defect 4, while lower frequencies can pass through defect 4. This can cause the second portion 29 of wave 23 received by receiver 26 to be attenuated, not detectable, and/or have a smaller amplitude relative to wave 23.

Referring to FIG. 9, an example of a signal 25 received by receiver 26 for the illustrated version is shown in a solid line. For instance, the portion 29 of wave 23 received is shown at region r having a smaller amplitude relative to the directly received wave 23 of the previous version where defect 4 was positioned outside of signal generator 24 and receiver 26. The reflected portion 27 of wave 23 was also not detectable by receiver 26 due to defect 4 being positioned within signal generator 24 and receiver 26. In some versions, the amount that wave 23 is attenuated by defect 4 can indicate a size and/or position of defect 4. For instance, a signal 25 received by receiver 26 having a significantly smaller amplitude and/or lower frequency than wave 23 can indicate a larger defect 4 than a signal 25 having a slightly smaller amplitude and/or lower frequency than wave 23. Still other suitable configurations and methods for detecting a near sub-surface defect 4 within cast metal 2 will be apparent to one with ordinary skill in the art in view of the teachings herein.

B. Exemplary Remediation Device

Figure 10:
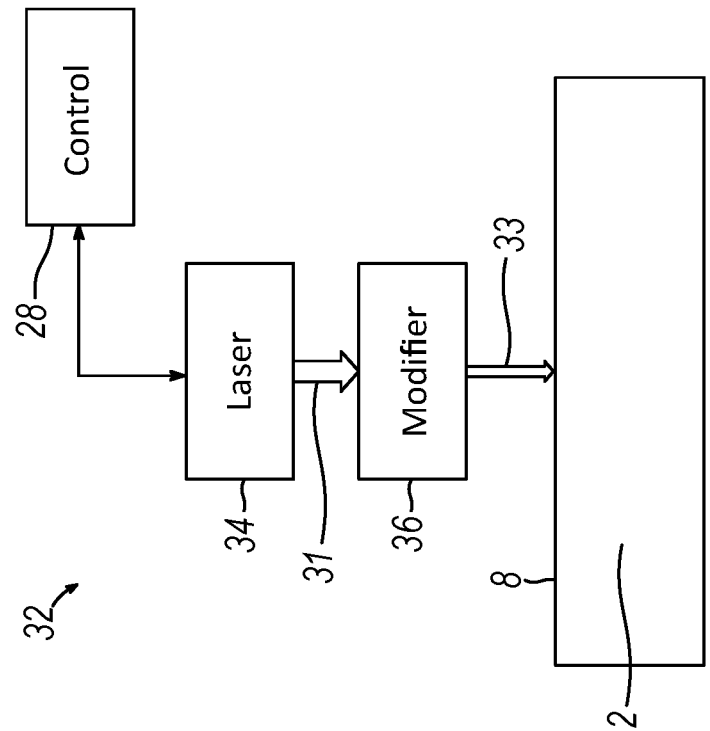
FIG. 10 is a side elevational view of a remediation unit of the defect detection and remediation system of FIG. 1.

Once a defect 4 has been detected by detection device 20, system 10 can determine whether the detected defect 4 can be remediated by remediation device 30. For instance, depending on the size or extent of defect 4 detected by detection device 20, system 10 can determine whether it is more cost-effective and/or efficient to remediate the defect 4 or reject a portion of cast metal 2 without remediation. Referring to FIG. 10, remediation device 30 comprises one or more lasers 34 configured to generate a beam 31 toward casted metal 2. Laser 34 can include a pulsed laser, an intense continuous-wave laser, and/or any other suitable laser for remediating defects as will be discussed in more detail below. In the illustrated version, laser 34 is coupled with a control 28 such that control 28 can be configured to control the output of laser 34 (e.g., a pulse rate, a pulse energy, a wavelength, frequency etc. of beam 31). Control 28 can also be configured to control a position of laser 34 such that beam 31 of laser 34 is targeted to a targeted area of cast metal 2 containing defect 4 detected by detection unit 20. For instance, remediation unit 32 can be aimed at the targeted area, while traveling with cast metal 2, to remediate the targeted area.

In some versions, beam 31 generated by laser 34 is directed through a modifier 36 that is configured to modify a direction and/or intensity of beam 31 to form a modified beam 33. Methods of forming modified beam 33 with modifier 36 can include beam steering by fixed or galvanometric scanning mirrors, beam focusing through telescoping or converging optics, and/or beam shaping with homogenizers, amplitude masks, refractive elements, and/or diffractive optical elements. Additionally or alternatively, spatial light modulators, deformable mirrors, and/or tunable acoustic gradient index lenses can allow real-time modulation of an intensity of modified beam 33. Accordingly, remediation unit 32 is configured to accurately deliver a large amount of energy generated by laser 34 into a targeted region of cast metal 2.

As one or more beams 31, 33 contact a surface of cast metal 2, at least a portion of the energy of beams 31, 33 is absorbed at and/or near surface 8 of cast metal 2 such that the absorbed energy can modify the targeted area of material of cast metal 2 containing defect 4 at and/or near a surface 8 of cast metal 2 without altering a bulk of material of cast metal 2. For instance, remediation unit 30 can be configured to remediate a near sub-surface defect 4 by smoothing and/or removing such defect 4 from the targeted area at and/or near a surface 8 of cast metal 2 such that the targeted area is smoother or more continuous after such defect 4 has been remediated.

Laser 34 can be configured to remediate a defect by ablation, grinding, melting, scarfing and/or other suitable method to smooth the defect. For instance, ablation is the removal of material by direct absorption of laser energy. Onset of ablation occurs above a threshold fluence, which can depend on an absorption mechanism, material properties, and/or laser parameters (e.g., wavelength, pulse duration, pulse amplitude, etc.). A typical threshold fluence for metals is between about 1 and about 10 Joules per square centimeter. In some other versions, melting can occur when the absorbed laser energy is above a threshold of melting to thereby melt a select area of cast metal 2. Accordingly, a pool of molten metal can be formed in the select area such that the molten metal resolidifies in a smoother configuration. Additionally or alternatively, laser 34 and/or other suitable device can be configured to provide grinding in a targeted area of cast metal 2 having a defect.

Accordingly, other suitable configurations for remediation unit 32 will be apparent to one with ordinary skill in the art in view of the teachings herein.

II. Exemplary Method of Detecting and Remediating a Defect

Referring to FIGS. 1-2 and 10-11, a method 50 of detecting and/or remediating a defect 4 in a cast metal 2 comprises a step 52 of translating a cast metal 2 relative to a defect detection and remediation system 10. Such translation can occur when cast metal 2 is at a high and/or cooled temperature, before and/or after cast metal 2 is cut into a slab. Method 50 further comprises a step 54 of detecting whether a defect 4 is present at and/or near a surface 8 of cast metal 2. For instance, receiver 26 of detection unit 22 can receive a signal 25 caused by one or more ultrasonic waves 23 generated by a pulse 21 of signal generator 24 that has traveled a distance x through cast metal 2. Based on characteristics (e.g., amplitude, wavelength, frequency, etc.) of the received signal 25, system 10 can determine whether a defect 4 is present within cast metal 2. For instance, the characteristics of signal 25 can be compared to characteristics of the one or more waves 23 generated by signal generator 24 and/or to a predetermined level. If the characteristics of signal 25 differ from the characteristics of wave 23 and/or the characteristics of signal 25 fail to meet the predetermined level, system 10 can determine that a defect 4 is present. System 10 can further determine a position and/or size of the detected defect 4 based on the characteristics of signal 25.

Method 50 further comprises a step 56 of determining whether a detected defect 4 can be remediated. For instance, based on the analyzed characteristics of signal 25 received by receiver 26, system 10 can determine whether it is more cost-effective and/or efficient to remediate the detected defect 4 or reject a portion of cast metal 2 without remediating defect 4. If system 10 determined that defect 4 can be remediated, method 50 further comprises a step 58 of remediating the detected defect 4 to form a remediated area 6. For instance, laser 34 of remediation unit 32 can generate a beam 31 that can be at least partially absorbed by cast metal 2 at a targeted area to remediate defect 4, such as by ablation, grinding, melting, scarfing, etc., to form a remediated area 6 at and/or near a surface 8 of cast metal 2 that has a smoother and/or more continuous finish than prior to remediation.

This can thereby reduce the number and/or extent of defects 4 at and/or near a surface 8 of cast metal 2. Accordingly, system 10 can provide targeted remediation of defects 4 within cast metal 2 prior to subsequent finishing, before such defects 4 become more serious and/or are found in a more finished product. This can reduce the amount of cast metal 2 that is redirected for surface scarfing and/or rejection to thereby decrease the amount of costs and/or increase the efficiency of the continuous casting process. Still other suitable methods for detecting and/or remediating a defect 4 within cast metal 2 will be apparent to one with ordinary skill in view of the teachings herein.

III. Examples

Example 1

In an initial test, three blocks, each having dimensions of about 14 centimeters by about 18 centimeters by about 12 centimeters, were cut from a cast metal. Each block included one smooth face of as-cast material and five remaining faces of rough, cut material. Six holes were then drilled into the smaller faces, below the larger faces, which included the as-cast surface as well as the opposed cut surface. The holes included a length of about 40 millimeters, varying diameters of about 1 millimeter, about 2 millimeters, and about 3 millimeters, and were buried at varying depths of about 1 millimeter, about 2 millimeters, and about 3 millimeters to simulate near sub-surface defects 4 in cast metal 2, as described above. The holes were then filled with fused mold powder, which is a typical material found inside near sub-surface defects.

A detection device having a similar structure to detection device 20 described above was used to detect the simulated near sub-surface defects. The detection device was tested with a first signal generator including a laser and a second signal generator including an EMAT. The detection device further included a receiver including an EMAT. The detection device was moved along the larger faces of each block. The results of the signal received by the receiver was analyzed in both frequency and amplitude, with the frequency spectrum of the received signal being split into bands each of about 100 kilohertz bandwidth between about 50 and about 1050 kilohertz in order to observe relative amplitudes of different frequencies received.

Figure 12:
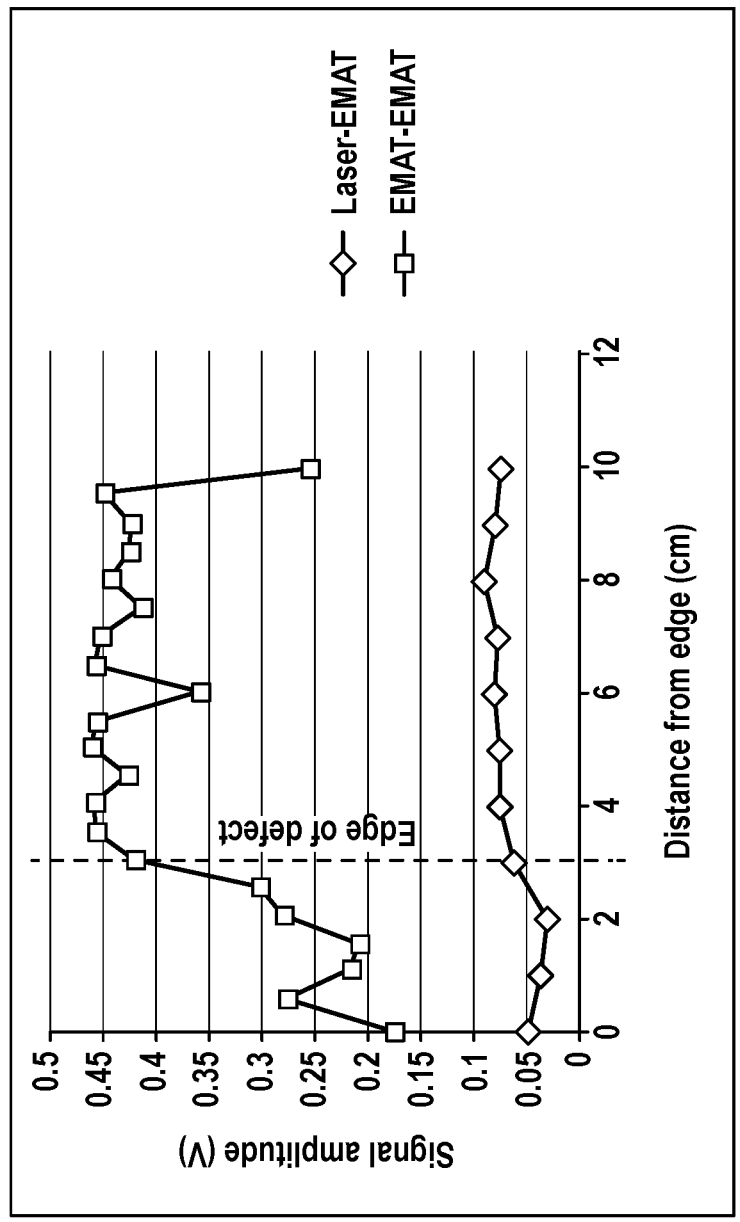
FIG. 12 is a graph of a signal received of by a detection unit on a test block of cast metal having a simulated sub-surface defect.

An analyzed signal is shown in FIG. 12 for one of the tested blocks having a hole with a diameter of about 3 millimeters and buried about 1 millimeter within the smooth, as-cast surface of the block. As shown in FIG. 12, an amplitude of the signal is shown versus a distance to an edge of the block for both the laser-EMAT and EMAT-EMAT detection device configurations. The hole was positioned from about 0 centimeters to about 3 centimeters along the x-axis. As shown, the amplitude of the received signal for both of the laser-EMAT and EMAT-EMAT configurations of the detection device is smaller in the region containing the hole relative to the amplitude of the received signal in the region without the hole. Accordingly, it was determined that both of the laser-EMAT and EMAT-EMAT configurations were capable of detecting near sub-surface defects within a cast metal.

Example 2

After the test described above in Example 1, another detection device was used to detect whether holes were present in the same blocks as described in Example 1. The detection device included a broadband high-power pulsar EMAT (Sonemat HPP2000) as a signal generator and another EMAT (Sonemat SAA1000) was included in connection with an amplifier as a receiver to provide sufficient amplification of the ultrasound signals received. The detection device was then positioned above a smooth, as-cast surface of a block at various regions along the surface of the block. For instance, the detection device was positioned above a region having no sub-surface holes and other regions having sub-surface holes with varying diameters of about 1 millimeter, about 2 millimeters, and about 3 millimeters. In the case where the detection device was positioned over a region containing a sub-surface hole, the EMATs were positioned such that a center of the respective coils of each EMAT were separated by about 140 millimeters, with the hole equidistant to both EMATs.

Figures 13, 14, 15:
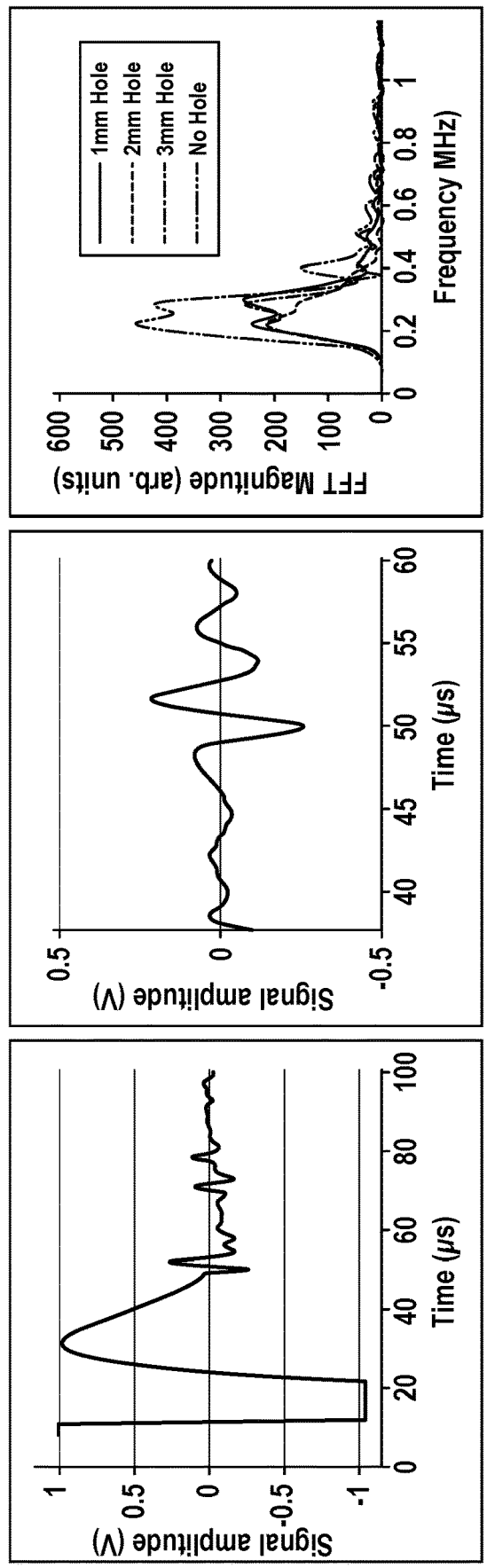
FIG. 13 is a graph of a signal of raw data received by another detection unit on the test block of cast metal having the simulated sub-surface defect.
FIG. 14 is a graph of the signal of FIG. 13 that has been modified by a polynomial trend.
FIG. 15 is a graph of the signal of FIG. 14 that has been modified by a Fast Fourier Transform.

Raw data of the signal received by the receiving EMAT was recorded and is shown in FIG. 13. A polynomial trend was then fitted and removed from the raw data, as shown in FIG. 14. A Fast Fourier Transform (FTT) was then applied to analyze the signal in the frequency domain, as shown in FIG. 15. As shown in FIG. 15, the signals received in the regions containing holes had lower frequencies relative to the signal received in the region without a hole. Accordingly, it was determined that the detection device was capable of detecting near sub-surface defects within a cast metal.

Example 3

A defect detection and remediation system for use on a cast metal comprising: a detection device comprising one or more detection units configured to detect a defect within the cast metal near a surface of the cast metal; and a remediation device comprising one or more remediation units configured to remediate the defect detected by the detection device in a target area of the cast metal containing the detected defect.

Example 4

The system of example 3, wherein the system is configured to remediate the detected defect during a continuous casting stage prior to subsequent finishing.

Example 5

The system of any one or more of examples 3 through 4, wherein the system is configured to remediate the detected defect when the cast metal has a temperature of up to about 1,000° C.

Example 6

The system of any one or more of examples 3 through 5, wherein each detection unit comprises: one or more signal generators configured to generate a pulse directed toward the surface of the cast metal to thereby generate one or more ultrasonic waves within the cast metal; and one or more receivers spaced a distance away from the one or more signal generators, wherein the one or more receivers are configured to receive a signal caused by the one or more ultrasonic waves within the cast metal.

Example 7

The system of example 6, wherein the system is configured to detect the presence of the defect based on one or more characteristics of the signal received by the receiver.

Example 8

The system of example 7, wherein the one or more characteristics of the signal includes a select one or both of an amplitude and a frequency of the received signal.

Example 9

The system of any one or more of examples 6 through 8, wherein the signal generator comprises a laser.

Example 10

The system of any one or more of examples 6 through 9, wherein the signal generator comprises an electromagnetic acoustic transducer.

Example 11

The system of any one or more of examples 6 through 10, wherein the receiver comprises an electromagnetic acoustic transducer.

Example 12

The system of any one or more of examples 6 through 11, wherein the receiver is configured to receive a range of frequencies from about 50 kilohertz to about 1050 kilohertz.

Example 13

The system of any one or more of examples 3 through 12, wherein the system is configured to detect a select one or both of a size and a position of the defect.

Example 14

The system of example 13, wherein the system is configured to determine whether to remediate the defect based one or both of the size and the position of the defect.

Example 15

The system of any one or more of examples 3 through 14, wherein each remediation unit comprises one or more lasers configured to generate beam toward the surface of the casted metal in the target area.

Example 16

The system of any one or more examples 3 through 15, where each remediation unit is configured to remediate the detected defect in the target area by a select one or more of ablation, melting, grinding, and scarfing.

Example 17

A defect detection and remediation system for use on a cast metal comprising: a detection device comprising one or more detection units, wherein the detection device is configured to detect a sub-surface defect within the cast metal, wherein each detection unit comprises: a signal generator configured to generate a pulse directed toward a surface of the cast metal to thereby generate one or more ultrasonic waves within the cast metal, and a receiver spaced a distance away from the signal generator, wherein the receiver is configured to receive a signal caused by the one or more ultrasonic waves, wherein the detection device is configured to detect the sub-surface defect based on the received signal; and a remediation device comprising one or more remediation units, wherein each remediation unit comprises a laser configured to produce a beam directed toward the surface of the cast metal in a target area containing the detected defect, wherein the beam is configured to remediate the detected defect in the target area.

Example 18

A method of operating a defect detection and remediation system to remediate a sub-surface defect in a cast metal, wherein the defect detection and remediation system comprises a detection device having one or more detection units and a remediation device having one or more remediation units, the method comprising the steps of: translating a cast metal relative to the defect detection and remediation system; detecting whether a defect is present near a surface of the cast metal with the one or more detection units of the detection device; determining whether the defect can be remediated when the defect is detected by the detection device; and remediating the detected defect in a target area containing the detected defect with the one or more remediation units of the remediation device when the defect is determined to be remediated to form a remediated area.

Example 19

The method of example 18, wherein the cast metal is translated relative to the defect detection and remediation system during a continuous casting process when the steel has a temperature of up to about 1,000° C.

Example 20

The method of any one or more of examples 18 through 19, wherein the step of detecting whether a defect is present near the surface of the cast metal comprises: generating an ultrasonic wave within the cast metal; and receiving a signal caused by the ultrasonic wave within the cast metal.

Example 21

The method of any one or more of examples 18 through 20, further comprising determining one or both of a size and a position of the defect when the defect is detected by the detection device.

Example 22

The method of any one or more of examples 18 through 21, remediating the detected defect comprises one or more of ablating, melting, grinding, and scarfing the target area.

What is claimed is:

1. A defect detection and remediation system for use on a cast metal comprising:
   (a) a detection device comprising one or more detection units configured to detect a defect within the cast metal near a surface of the cast metal, wherein each detection unit comprises:
      (i) one or more signal generators configured to generate a pulse directed toward the surface of the cast metal to thereby generate one or more ultrasonic waves within the cast metal, the one or more signal generators spaced away from a surface of the cast metal without a physical coupling with the cast metal, and
      (ii) one or more receivers spaced a distance away from the one or more signal generators and spaced away from the surface of the cast metal without a physical coupling with the cast metal, wherein the one or more receivers are configured to receive a signal caused by the one or more ultrasonic waves within the cast metal; and
   (b) a remediation device comprising one or more remediation units configured to remediate the defect detected by the detection device in a target area of the cast metal containing the detected defect, wherein each remediation unit comprises one or more lasers configured to generate a beam toward the surface of the casted metal in the target area.

2. The system of claim 1, wherein the system is configured to remediate the detected defect during a continuous casting stage prior to subsequent finishing.

3. The system of claim 1, wherein the system is configured to remediate the detected defect when the cast metal has a temperature of up to about 1,000° C.

4. The system of claim 1, wherein the system is configured to detect the presence of the defect based on one or more characteristics of the signal received by the receiver.

5. The system of claim 4, wherein the one or more characteristics of the signal includes a select one or both of an amplitude and a frequency of the received signal.

6. The system of claim 1, wherein the signal generator comprises a laser.

7. The system of claim 1, wherein the signal generator comprises an electromagnetic acoustic transducer.

8. The system of claim 1, wherein the receiver comprises an electromagnetic acoustic transducer.

9. The system of claim 1, wherein the receiver is configured to receive a range of frequencies from about 50 kilohertz to about 1050 kilohertz.

10. The system of claim 1, wherein the system is configured to detect a select one or both of a size and a position of the defect.

11. The system of claim 10, wherein the system is configured to determine whether to remediate the defect based one or both of the size and the position of the defect.

12. The system of claim 1, where each remediation unit is configured to remediate the detected defect in the target area by a select one or more of ablation, melting, grinding, and scarfing.

13. A method of operating a defect detection and remediation system to remediate a sub-surface defect in a cast metal, wherein the defect detection and remediation system comprises a detection device having one or more detection units and a remediation device having one or more remediation units, the method comprising the steps of:
   (a) translating a cast metal relative to the defect detection and remediation system;
   (b) detecting whether a defect is present near a surface of the cast metal with the one or more detection units of the detection device, the detection device having one or more signal generators spaced away from a surface of the cast metal and without a physical coupling with the cast metal, the signal generators generate a pulse directed toward the surface of the cast metal to thereby generate one or more ultrasonic waves within the cast metal, the detection device having one or more receivers spaced a distance away from the one or more signal generators and spaced away from the surface of the cast metal and without a physical coupling with the cast metal, where the one or more receivers are configured to receive a signal caused by the one or more ultrasonic waves within the cast metal;
(c) determining whether the defect is configured to be remediated when the defect is detected by the detection device; and
(d) remediating the detected defect in a target area containing the detected defect with the one or more remediation units of the remediation device when the defect is determined to be remediated to form a remediated area, wherein each remediation unit comprises one or more lasers configured to generate a beam toward the surface of the casted metal in the target area.

14. The method of claim 13, wherein the cast metal is translated relative to the defect detection and remediation system during a continuous casting process when the steel has a temperature of up to about 1,000° C.

15. The method of claim 13, further comprising determining one or both of a size and a position of the defect when the defect is detected by the detection device.

16. The method of claim 13, remediating the detected defect comprises one or more of ablating, melting, grinding, and scarfing the target area.

* * * * *